(12) United States Patent
Wang et al.

(10) Patent No.: US 12,232,921 B2
(45) Date of Patent: Feb. 25, 2025

(54) ROOT CANAL THERAPY DEVICE WITH MECHANICAL VIBRATION MODE AND ROTATION DRIVE MODE

(71) Applicant: SHENZHEN SUPERLINE TECHNOLOGY CO., LTD., Guangdong (CN)

(72) Inventors: Zhong Wang, Guangdong (CN); Jing Song Zhou, Guangdong (CN)

(73) Assignee: SHENZHEN SUPERLINE TECHNOLOGY CO., LTD., Guangdong (CN)

( * ) Notice: Subject to any disclaimer, the term of this patent is extended or adjusted under 35 U.S.C. 154(b) by 467 days.

(21) Appl. No.: 17/769,339

(22) PCT Filed: Mar. 15, 2021

(86) PCT No.: PCT/CN2021/080776
§ 371 (c)(1),
(2) Date: Apr. 15, 2022

(87) PCT Pub. No.: WO2022/188190
PCT Pub. Date: Sep. 15, 2022

(65) Prior Publication Data
US 2023/0157787 A1    May 25, 2023

(30) Foreign Application Priority Data
Mar. 12, 2021 (CN) .......................... 202110268684.3

(51) Int. Cl.
*A61C 5/42* (2017.01)
*A61C 1/00* (2006.01)
(Continued)

(52) U.S. Cl.
CPC ................ *A61C 5/42* (2017.02); *A61C 1/003* (2013.01); *A61C 1/07* (2013.01); *A61C 1/185* (2013.01)

(58) Field of Classification Search
CPC .. A61C 1/07; A61C 5/42; A61C 1/003; A61C 1/185
See application file for complete search history.

(56) References Cited

U.S. PATENT DOCUMENTS 4,135,302 A    1/1979  Kronman et al.
5,169,312 A *  12/1992 Berlin ...................... A61C 1/18
                                                          433/122

(Continued)

FOREIGN PATENT DOCUMENTS

CA      2199685     9/1997
CN    205548724     9/2016
(Continued)

OTHER PUBLICATIONS

"International Search Report (Form PCT/ISA/210) of PCT/CN2021/080776," mailed on Dec. 8, 2021, pp. 1-5.
(Continued)

*Primary Examiner* — Ralph A Lewis
(74) *Attorney, Agent, or Firm* — JEEN IP LAW, LLC

(57) ABSTRACT

A root canal therapy device with a mechanical vibration mode and a rotation drive mode includes a head, a handle, a first flexible drive shaft and a second flexible drive shaft. The head includes an outer main part, a mandrel part for mounting a root canal file, a first drive input shaft part and a second drive input shaft part. The mandrel part is mounted in the outer main part. A first drive motor and a second drive motor are disposed on the handle. The invention has the following beneficial effects: the root canal file can rotate and vibrate during root canal preparation, so that the wall of a root canal is efficiently cut by the file; and the file can also (Continued)

vibrate, so that cutting resistance and cutting temperature are effectively reduced, a smear layer is avoided, and the quality and efficiency of root canal preparation are improved.

9 Claims, 5 Drawing Sheets

(51) Int. Cl.
  *A61C 1/07* (2006.01)
  *A61C 1/18* (2006.01)

(56) References Cited

U.S. PATENT DOCUMENTS

| | | | | |
|---|---|---|---|---|
| 2015/0216551 | A1* | 8/2015 | Dieras | A61B 17/320068 606/169 |
| 2017/0245960 | A1* | 8/2017 | Ghadami | A61C 1/141 |
| 2021/0330425 | A1* | 10/2021 | Yang | A61C 1/0061 |
| 2023/0053221 | A1* | 2/2023 | Wu | A61C 5/40 |
| 2023/0157787 | A1* | 5/2023 | Wang | A61C 1/06 433/215 |

FOREIGN PATENT DOCUMENTS

| | | |
|---|---|---|
| CN | 206729941 | 12/2017 |
| CN | 111000638 | 4/2020 |
| CN | 112168384 | 1/2021 |
| CN | 112353510 | 2/2021 |

OTHER PUBLICATIONS

"Written Opinion of the International Searching Authority (Form PCT/ISA/237) of PCT/CN2021/080776," mailed on Dec. 8, 2021, pp. 1-4.

* cited by examiner

ROOT CANAL THERAPY DEVICE WITH MECHANICAL VIBRATION MODE AND ROTATION DRIVE MODE

BACKGROUND OF THE INVENTION

Technical Field

The invention relates to a root canal therapy device, in particular to a root canal therapy device with a mechanical vibration mode and a rotation drive mode.

Description of Related Art

Root canal therapy is a satisfying and mature method which is used for treating various pulpitides, pulp necrosis and other tooth diseases at present mainly through the following process: a root canal instrument is used to thoroughly clean the interior and wall of a pathological root canal to remove pathological tissue and create a complete and smooth inner cavity of the root canal; then, the prepared root canal is filled with other materials such as gutta percha points to fulfill the purpose of repairing and treating the root canal.

An existing common root canal preparation method is implemented by cooperative use of a root canal therapy apparatus and a root canal instrument. During work, the root canal therapy apparatus drives the root canal instrument to move in a root canal to shape and clean the inner wall of the root canal. The root canal therapy apparatus has the advantages of high root canal molding efficiency, good molding effect, and lower work intensity of operators.

A traditional root canal therapy apparatus system typically includes a rotary root canal therapy apparatus and an ultrasonic root canal therapy apparatus.

When working, the rotary root canal therapy apparatus drives a root canal instrument to rotate to cut the inner wall of a root canal by means of a blade of the instrument so as to shape the root canal, and the rotary root canal therapy apparatus is generally powered by an electromagnetic motor. The rotary root canal therapy apparatus has the following advantages: the output speed of the motor is stable, the torque is controllable, the apparatus is able to move forward and backwards alternately, and the head of the apparatus is able to realize high-temperature and high-pressure sterilization. However, when the rotary root canal therapy apparatus is used for root canal preparation, a smear layer may be formed on the wall of the root canal due to the structure and motion mode of a root canal file.

The working part of the root canal file is tapered and is provided with threads. In order to form a cutting edge, the working part should be in a certain sectional shape, as shown in FIG. 1. Due to the limitation of the radial size and the constraint of the machining method, the root canal file, as a cutting tool for dental surgery, usually has a large the cutting angle $\gamma_0$, and cuts the wall of the root canal by scraping, so that the wall of the root canal will be inevitably squeezed by the root canal file and frictional heat will be generated.

When the rotary root canal therapy apparatus is used for root canal preparation, the frictional heat generated by the root canal file will lead to denaturation of organic matter of the wall of the root canal, and dentine chips, liquid from dentinal tubules, sputum and bacteria are adhered to the inner wall of the root canal under a drilling and grinding pressure of the file, thus forming a smear layer with a thickness of 1-2 μm. The smear layer may block lateral canals and hinder drugs from infiltrating into the side wall of the root canal and the dentinal tubules, thus leading to a failure to fill the lateral canals. If the smear layer cannot be removed completely, the failure rate of treatment will be increased, and more complications will be caused, which will directly compromise the treatment effect. So, it is necessary to further remove the smear layer.

The principle of the ultrasonic root canal therapy apparatus is that an ultrasonic transducer is used to drive a root canal file to generate ultrasonic vibrations to shape and clean the interior of a root canal, as shown in FIG. 2. The ultrasonic root canal therapy apparatus includes a transducer 2-1 which is made of a piezoelectric or magnetostrictive material and generates longitudinal vibrations under the excitation of an alternating electric field or a magnetic field, a working head 2-2, and an ultrasonic root canal file 2-3, wherein ultrasonic vibrations generated by the transducer 2-1 are transmitted to the root canal file 2-3 through the working head 2-2; however, due to the change of the vibration propagation direction, ultrasonic vibrations with horizontal vibration waves are generated at a pointed end of the root canal file 2-3. The ultrasonic vibrations of the pointed end of the root canal file will shear liquid around to generate cavitation effect to form a vacuole, and when the vacuole is broken, shock waves will be radiated from the center of the vacuole to act on the wall of the root canal, so that the root canal is shaped and cleaned.

The ultrasonic root canal therapy apparatus has unique advantages in the aspect of root canal cleaning; however, its capacity to shape the root canal is unsatisfying because the ultrasonic canal root file does not rotate during work and only the pointed end has the function of removing the dentine; it can hardly avoid a serious deviation between the axis of the shaped root canal and the axis of the original root canal, and particularly, when a curved root canal is treated, local damage and side penetration of the root canal may be caused.

As for root canal therapy devices that have been disclosed to the present, the design of the rotary root canal therapy apparatus and the design of the ultrasonic vibration-type root canal therapy device are independent, so a common method for clinic root canal preparation is as follows: the rotary root canal therapy apparatus is used to shape the root canal first; and after the root canal is shaped, the ultrasonic vibration-type root canal therapy device is used to remove the smear layer and clean the root canal. If the root canal file can vibrate slightly while rotating in the root canal for cutting, the chip removal capacity of the root canal file will be improved, the cutting resistance and the cutting temperature will be drastically reduced, the smear layer will be effectively avoided, the quality of root canal preparation will be improved, and the labor intensity of operations will be relieved.

A lot of technical information about machining devices for ultrasonic vibration and rotation has been disclosed. In a document Publication No. CN 107104514A which discloses an encircling wireless power transmission system suitable for automatic tool changing of an ultrasonic machining center, a piezoelectric ceramic vibrator is disposed on a rotating shaft of a motor to rotate synchronously with the rotating shaft, and power is supplied to a transducer in a contactless coil coupling manner. In a document Publication No. CN 108213508A which discloses an ultrasonic hand drill powered by a bearing, a needle bearing is used to supply power to an ultrasonic vibrator. In a document Publication No. CN 108988679A which discloses a longitudinal-longitudinal torsional hybrid sandwich-type transducer, a longitudinal-torsional coupling vibrator and piezoelectric ceramic are stacked to realize shock motions and rotational motions of an ultrasonic drilling tool.

In all the technical documents disclosed above, the ultrasonic vibrator is disposed on the rotating shaft capable of rotating, such a design realizes the combination of rotation and vibration, but the structure based on this design is too large and is not suitable for root canal therapy apparatuses because the head of the root canal therapy apparatuses that needs to be stretched into the oral cavity of patients and is very small.

In a document Publication No. 202011190107.9 which discloses a root canal therapy device with a complex motion mode, ultrasonic vibrations are transmitted from a handle to a head through an amplitude transformer to drive the entire head to vibrate, so that the root canal file can rotate and vibrate synchronously in the compound motion mode. This structure puts forward high requirements for the material, structural parameter design, and manufacturing of the amplitude transformer, thus being difficult to implement in actual application.

BRIEF SUMMARY OF THE INVENTION

To solve the problems in the prior art, the invention provides a root canal therapy device with a mechanical vibration mode and a rotation drive mode. The root canal therapy device is able to provide a mechanical vibration drive mode and a rotation drive mode.

The invention provides a root canal therapy device with a mechanical vibration mode and a rotation drive mode, including a head, a handle, a first flexible drive shaft and a second flexible drive shaft, wherein the head includes an outer main part, a mandrel part used for mounting a root canal file, a first drive input shaft part and a second drive input shaft part, the mandrel part is mounted in the outer main part, a first drive motor and a second drive motor are disposed on the handle, the first drive motor is connected to the first drive input shaft part through the first flexible drive shaft, the first drive input shaft part is connected to the mandrel part and drives the mandrel part to rotate, the second drive motor is connected to the second drive input shaft part through the second flexible drive shaft, and the second drive input shaft part is connected to the mandrel part and drives the mandrel part to vibrate mechanically.

As a further improvement of the invention, the second drive input shaft part includes a vibration input shaft, a wheel, an eccentric shaft, a connecting plate and a vibration output shaft, wherein the vibration input shaft has an end connected to the second flexible drive shaft and an end connected to the wheel, the eccentric shaft is mounted on the wheel, the connecting plate is mounted on the eccentric shaft, and the vibration output shaft is mounted on the connecting plate, is connected to the mandrel part and drives the mandrel part to vibrate mechanically.

As a further improvement of the invention, the mandrel part includes a T-shaped end gear shaft mounted in the outer main part, an upper sleeve, an I-shaped wheel and a lower sleeve, wherein the upper sleeve, the I-shaped wheel and the lower sleeve are disposed around the T-shaped end gear shaft from top to bottom, a lever ring is disposed around the I-shaped wheel and has an end rotatably connected to the outer main part and an end connected to the vibration output shaft, and T-shaped end gear shaft is connected to the first drive input shaft part.

As a further improvement of the invention, an upper ball groove is formed between an upper end of the I-shaped wheel and the upper sleeve, a lower ball groove is formed between a lower end of the I-shaped wheel and the lower sleeve, balls are disposed in the upper ball groove and the lower ball groove, and the I-shaped wheel is in clearance fit with the T-shaped end gear shaft.

As a further improvement of the invention, holes are formed in a waist of the I-shaped wheel in a radial direction, the lever ring is a circular ring provided with a left lug and a right lug, and is disposed around the middle of the I-shaped wheel, and convex shafts protruding inwards in the radial direction are disposed on the lever ring and are in clearance fit with the holes in the I-shaped wheel.

As a further improvement of the invention, a left lug shaft hole is formed in the left lug of the lever ring, a left lug shaft is disposed on the outer main part, the left lug shaft hole is in clearance fit with the left lug shaft, a side plate is disposed on the right lug of the lever ring, and a right lug shaft hole is formed in a waist of the side plate and is in clearance fit with the vibration output shaft.

As a further improvement of the invention, the first drive input shaft part includes a gear shaft mounted at the top of the side plate, and the gear shaft is engaged and connected with the T-shaped end gear shaft through a gear.

As a further improvement of the invention, the outer main part includes a sleeve, wherein the T-shaped end gear shaft, the upper sleeve, the I-shaped wheel and the lower sleeve are all mounted in the sleeve, an upper circular gland is disposed at an upper end of the sleeve, a lower circular gland is disposed at a lower end of the sleeve, the I-shaped wheel is disposed between the upper circular gland and the lower circular gland, an upper elastic ring is disposed between the I-shaped wheel and the upper circular gland, and a lower elastic ring is disposed between the I-shaped wheel and the lower circular gland.

As a further improvement of the invention, the upper elastic ring and the lower elastic ring are made of a high polymer material or a metal material, and are in the shape of a ring, a spring or a membrane.

As a further improvement of the invention, a lock nut is connected to a lower end of the T-shaped end gear shaft and is attached to a lower end of the lower sleeve, and the lock nut locks the upper sleeve, the I-shaped wheel and the lower sleeve on the T-shaped end gear shaft.

As a further improvement of the invention, the head, the flexible drive shafts and the handle may be separated from each other after use, and the head and the flexible drive shafts may be sterilized at a high temperature and a high pressure.

As a further improvement of the invention, the first flexible drive shaft and the second flexible drive shaft may be flexible shafts made of stainless steel wires, flexible shafts made of high polymer materials, or rigid drive shafts provided with cardan joints.

As a further improvement of the invention, the first flexible drive shaft and the second flexible drive shaft may be connected and disassembled rapidly, and the connection manner is not limited.

As a further improvement of the invention, the head and the handle are rapidly connected in in a stationary fit manner, thereby being easy to assemble and disassemble; and the connection manner is not limited.

The invention has the following beneficial effects: through the above solution, the root canal file can rotate and vibrate during root canal preparation, so that the wall of a root canal is efficiently cut by the file; and the file can also vibrate, so that cutting resistance and cutting temperature are effectively reduced, a smear layer is avoided, and the quality and efficiency of root canal preparation are improved.

BRIEF DESCRIPTION OF THE SEVERAL VIEWS OF THE DRAWINGS

FIGS. 5A, 5B, 5C and 5D are detailed structural diagrams of the head of the root canal therapy device with a mechanical vibration mode and a rotation drive mode, wherein FIG. 5A is a structural diagram of an outer main part, FIG. 5B is a schematic diagram of a mandrel, FIG. 5C is a sectional view thereof, and FIG. 5D is another sectional view thereof.

DETAILED DESCRIPTION OF THE INVENTION

The invention will be further described below in conjunction with the accompanying drawings and specific implementations.

The objective of the invention is to provide a root canal therapy device which is used tooth root canal treatment and has a mechanical vibration mode and a rotation drive mode. Compared with the traditional rotary root canal therapy apparatus and the traditional ultrasonic vibration-type root canal therapy apparatus, the root canal therapy device provided by the invention effectively combines rotational motions and vibrating motions, thus improving the chip removal capacity of root canal files, drastically reducing cutting resistance and cutting temperature, avoiding a smear layer, effectively improving the quality of root canal preparation, and relieving the labor intensity of operators.

The invention relates to a root canal therapy device with a mechanical vibration mode and a rotation drive mode. The root canal therapy device is mainly constituted by a head 1, a handle 2, and flexible drive shafts 3 and 4, as shown in FIG. 3.

Figure 1:
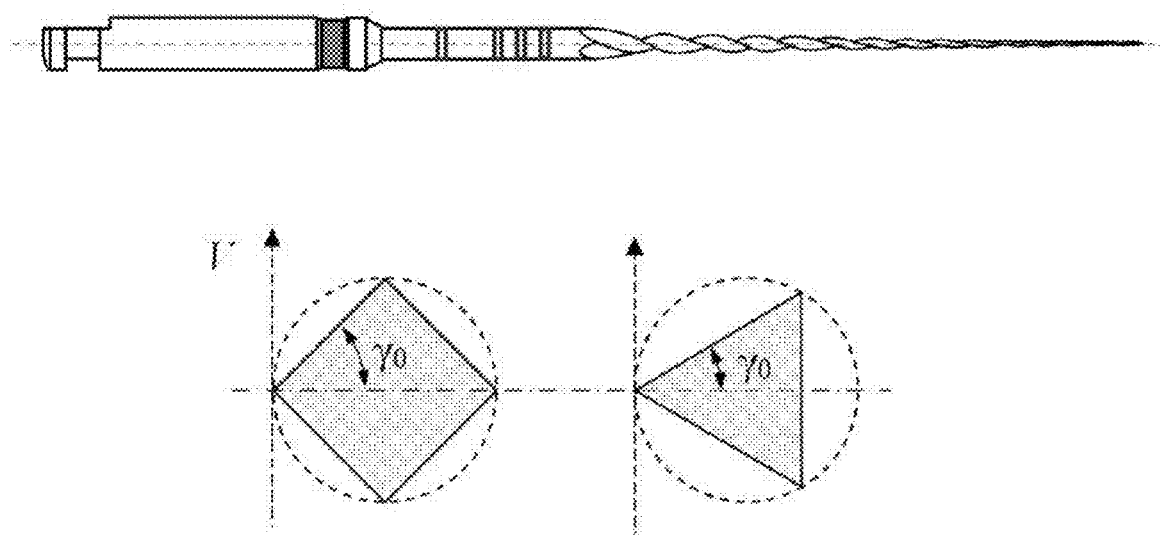
FIG. 1 is a schematic diagram of a root canal file in the prior art.
Figure 2:
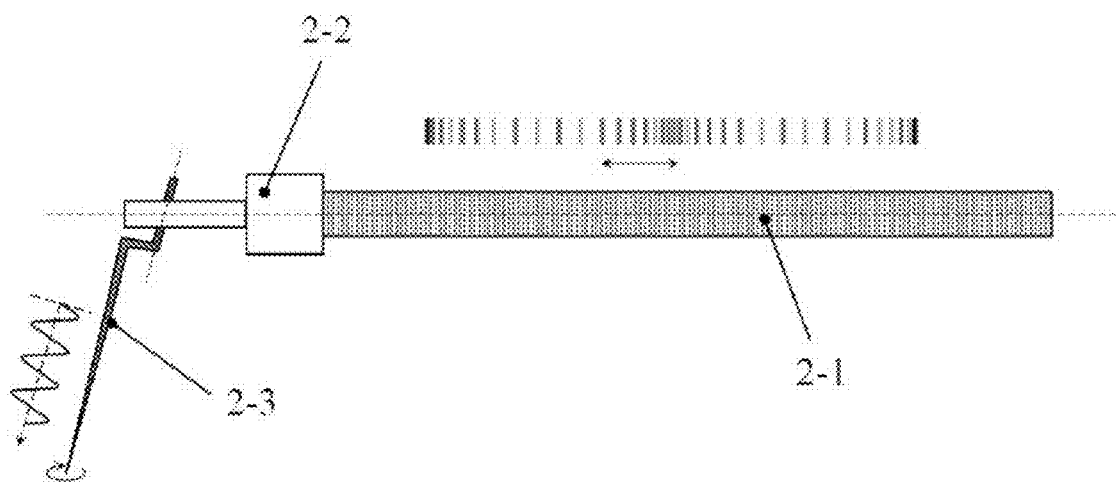
FIG. 2 is a principle diagram of an ultrasonic root canal therapy apparatus in the prior art.
Figure 3:
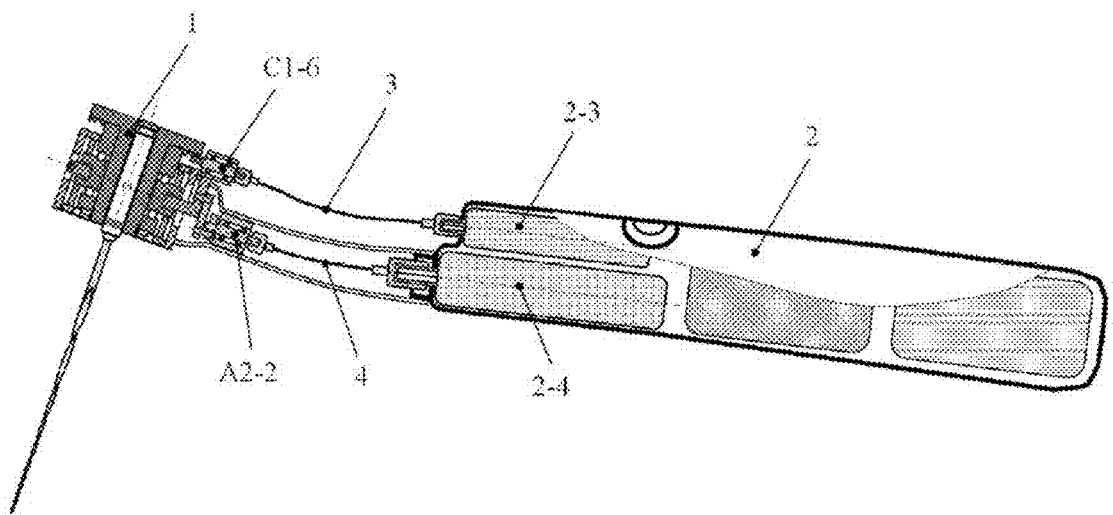
FIG. 3 is a schematic diagram of a root canal therapy device with a mechanical vibration mode and a rotation drive mode.
Figure 4:
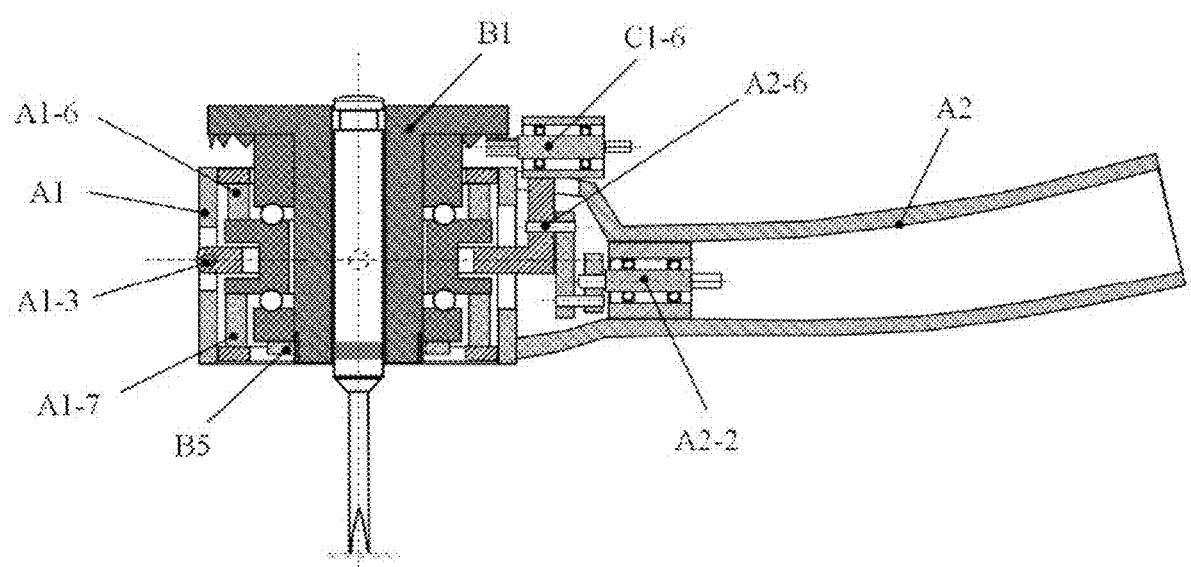
FIG. 4 is a schematic diagram of a head of the root canal therapy device with a mechanical vibration mode and a rotation drive mode.
Figure 5A:
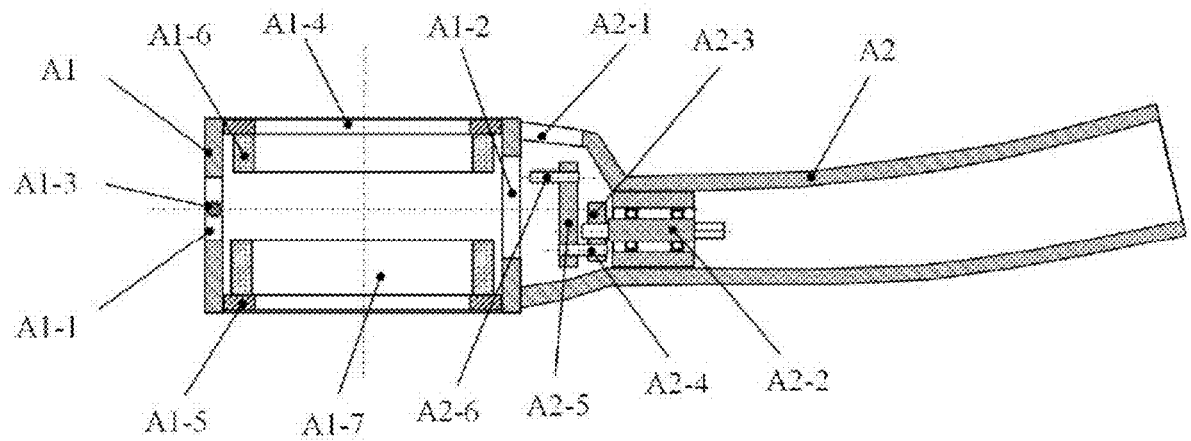
Figure 5B:
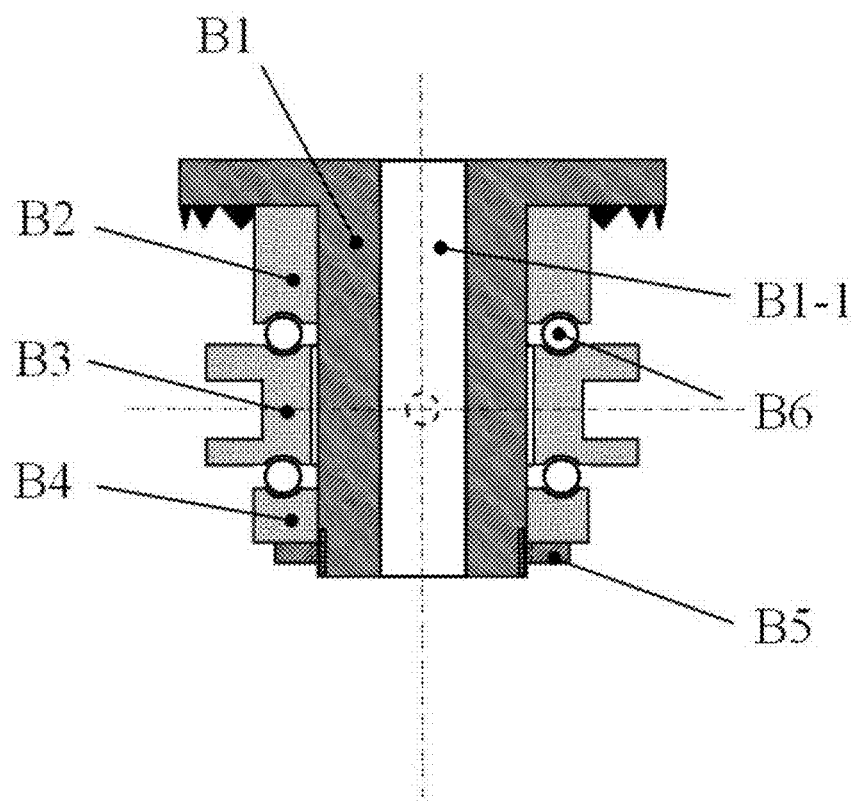

An outer main part of the head 1 is composed of a sleeve A1 and a shell A2, wherein the sleeve A1 and the shell A2 are rigidly and fixedly connected, and a tail end of the shell A2 is connected to the handle 2 in a stationary fit manner, as shown in FIG. 3, FIG. 4 and FIG. 5A. An orifice A1-1 and an orifice A1-2 are formed in a wall of the sleeve A1, a shaft A1-3 is mounted in the orifice A1-1, and an orifice A2-1 is formed in the shell A2. A circular gland A1-4 and a circular gland A1-5 are disposed at an upper end and a lower end of the sleeve A1 respectively, and an elastic ring A1-6 and an elastic ring A1-7 are disposed on inner sides of the circular glands respectively. An input shaft A2-2 is mounted in the shell A2, and the cross-section of a rear end of the input shaft A2-2 is square. A wheel A2-3 is fixedly mounted at a front end of the input shaft A2-2, and an eccentric shaft A2-4 is fixedly mounted on the wheel A2-3. A connecting plate A2-5 is movably mounted on the eccentric shaft A2-4, and a vibration output shaft A2-6 is fixedly mounted on the connecting plate A2-5.

The elastic ring A1-6 and the elastic ring A1-7 are made of a high polymer material or a metal, and are in the shape of a ring, a spring or a membrane. The mounting manner of the elastic rings is not limited.

Figure 5C:
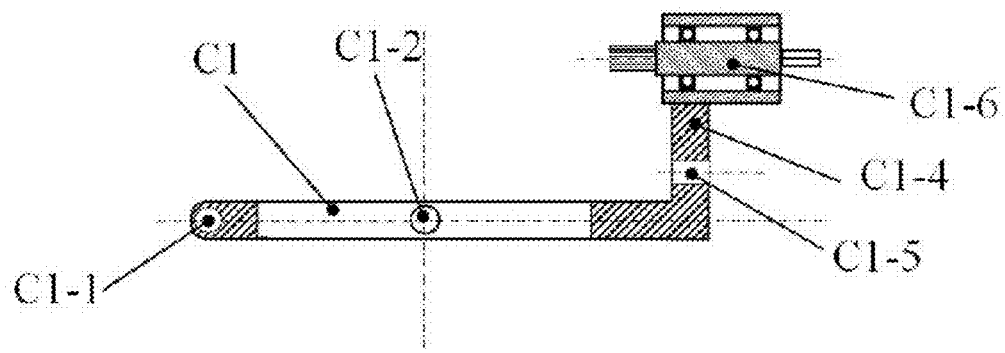
Figure 5D:
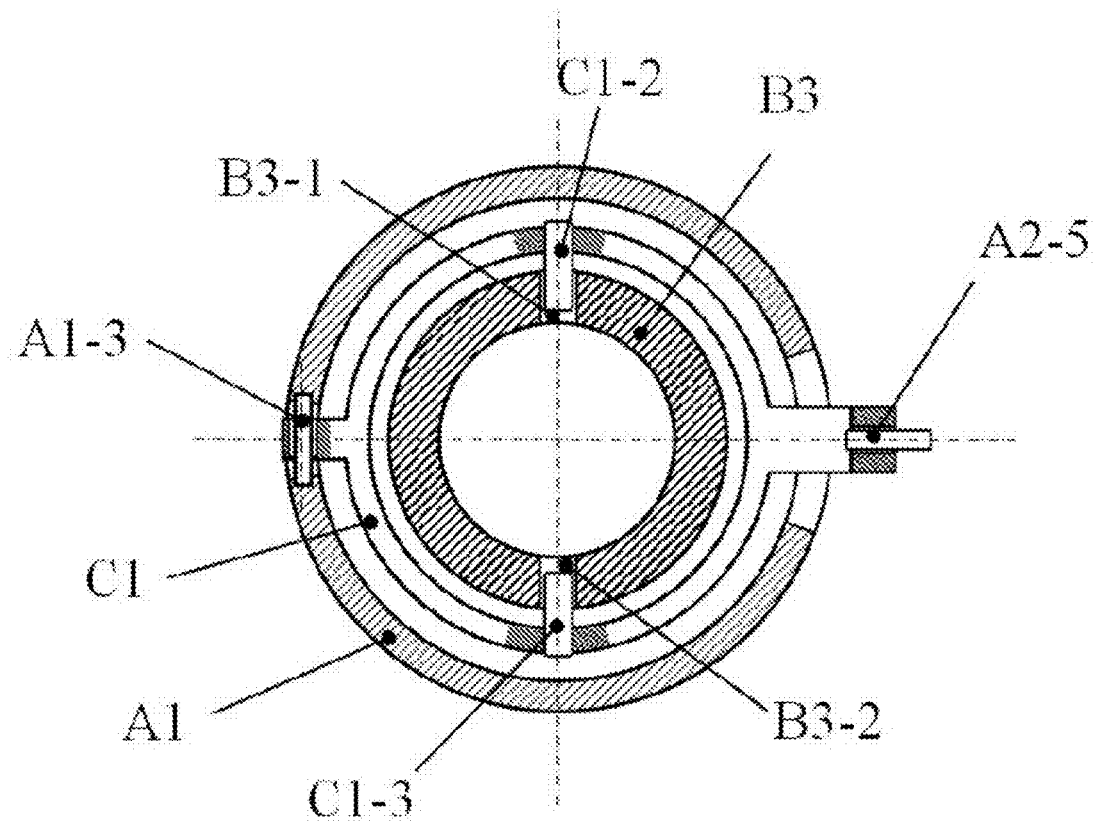

A mandrel part of the head 1 consists of a T-shaped end gear shaft B1, an upper sleeve B2, an I-shaped wheel B3, a lower sleeve B4 and a lock nut B5, as shown in FIG. 4, FIG. 5B, FIG. 5C and FIG. 5D. A through hole B1-1 is formed in the center of the T-shaped gear shaft B1, and a root canal file is fastened and mounted in the through hole B1-1. Balls B6 are arranged between the I-shaped wheel B3 and the upper sleeve B2 as well as between the I-shaped wheel B3 and the lower sleeve B4, grooves are formed in contact surfaces of the I-shaped wheel, the sleeves and the balls, and the balls B6 are able to roll in the grooves and will not fall off. A thread is arranged at a lower end of the T-shaped end gear shaft B1 and fits the lock nut B5, and the upper sleeve B2, the I-shaped wheel B3 and the lower sleeve B4 are locked on the T-shaped gear shaft B1 through the lock nut B5; a gap is formed between a center hole of the I-shaped wheel B3 and the T-shaped gear shaft B1, and the I-shaped wheel B3 is able to rotate freely with respect to the T-shaped gear shaft B1 through rolling of the balls B6. A hole B3-1 and a hole B3-2 are formed in a waist of the I-shaped wheel B3, as shown in FIG. 5D.

The structure of the T-shaped end gear shaft B1 is not limited. An end gear may be arranged in the middle of the gear shaft.

The head 1 further includes a lever ring C1, as shown in FIG. 4 and FIG. 5C. The lever ring C1 is a circular ring provided with lugs, and is disposed around the middle of the I-shaped wheel B3. A shaft hole C1-1 is formed in a left lug of the lever ring C1 and is in clearance fit with the shaft A1-3, and the lever ring C1 is able to swing around the shaft A1-3. A convex shaft C1-2 and a convex shaft C1-3, which protrude inwards, are fixedly mounted in the middle of the lever ring C1 and are in clearance fit with the hole B3-1 and the hole B2-1 of the I-shaped wheel B3 respectively, so that the I-shaped wheel B3 will be driven to move synchronously when the lever ring C1 swings. Because the I-shaped wheel B3 is locked on the T-shaped end gear shaft, the T-shaped end gear shaft will be driven to vibrate synchronously when the I-shaped wheel B3 vibrates. A side plate C1-4 is disposed on a right lug of the lever ring C1, and a shaft hole C1-5 is formed in a waist of the side plate and is clearance fit with the vibration output shaft C1-6. A gear shaft C1-6 is mounted at the top of the side plate C1-4, and the cross-section of ends of the gear shaft C1-6 is square.

As shown in FIG. 4 which illustrates an assembly diagram of the head 1, the I-shaped wheel B3 is elastically restrained in the middle of the sleeve A1 by means of the elastic ring A1-6 and the elastic ring A1-7, and the lever ring C1 is mounted on the I-shaped wheel B3, so that the head in the invention is formed. Wherein, the gear shaft C1-6 on the lever ring C1 is engaged with a gear on the T-shaped end gear shaft B1, and the shaft hole C1-5 in the side plate of the lever ring C1 is in clearance fit with the vibration output shaft A2-6.

Figure 6:
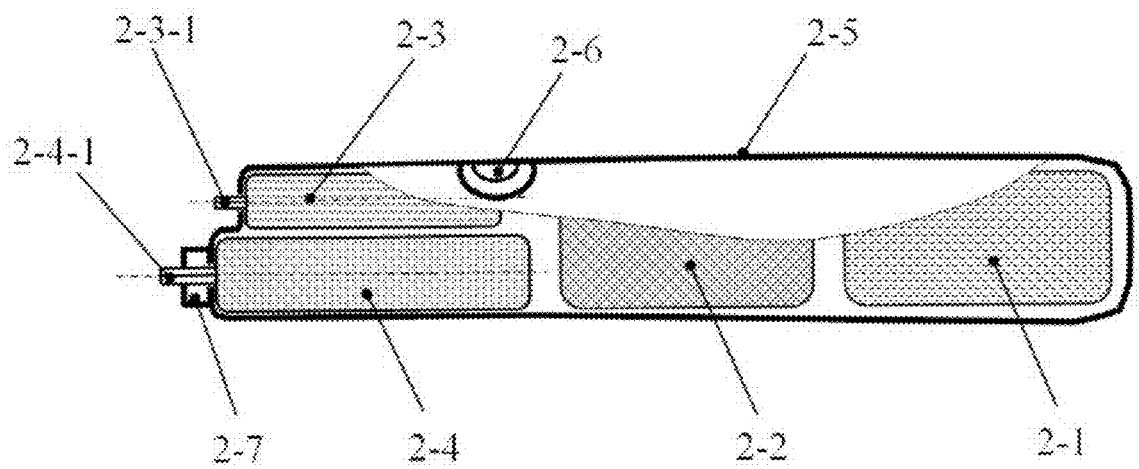
FIG. 6 is a schematic diagram of a handle of the root canal therapy device with a mechanical vibration mode and a rotation drive mode.

A power supply 2-1, a drive control system 2-2, and rotary motors 2-3 and 2-4 are disposed in the handle 2, wherein an output shaft 2-3-1 of the rotary motor 2-3 and an output shaft 2-4-1 of the rotary motor 2-4 stretch out of a handle shell 2-5. An operation key 2-6 is disposed on the handle shell 2-5. A seam allowance 2-7 connected to the shell A2 is formed disposed a front end of the handle shell 2-5. The cross-section of the output shaft 2-3-1 of the rotary motor 2-3 and the output shaft of the 2-4-1 of the rotary motor 2-4 is square, as shown in FIG. 6.

Figure 7:
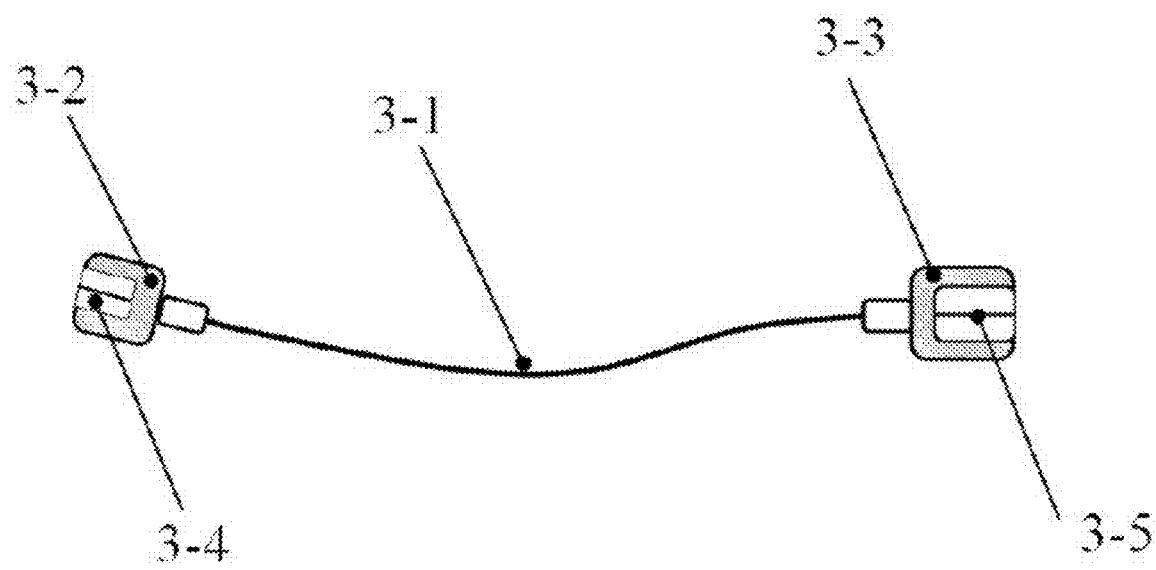
FIG. 7 is a schematic diagram of a flexible drive shaft of the root canal therapy device with a mechanical vibration mode and a rotation drive mode.

The structure of the flexible drive shaft 3 and the flexible drive shaft 4 is shown in FIG. 7. A coupling 3-2 and a coupling 3-3 are fastened and connected to two ends of a flexible shaft 3-1, a hole 3-4 in a square sectional shape and a hole 3-5 in a square sectional shape are formed in the center of the coupling 3-2 and in the center of the coupling 3-3 respectively, the hole 3-4 is in clearance fit with an end, in a square sectional shape, of the gear shaft C1-6, and the hole 3-5 is in clearance fit with the output shaft 2-3-1 of the rotary motor 2-3. The rotation of the rotary motor 2-3 is transmitted to the gear shaft C1-6 through the flexible shaft 3 to drive the gear shaft C1-6 to rotate. In this way, the rotation of the rotary motor 2-4 is transmitted to the output shaft A2-2 through the flexible shaft 4.

Flexible shafts of the flexible drive shaft 3 and the flexible drive shaft 4 may be flexible shafts made of stainless steel wires, flexible shafts made of high polymer materials, or rigid drive shafts provided with cardan joints.

When the root canal therapy device with a mechanical vibration mode and a rotation drive mode of the invention is used, the head 1 is connected to the seam allowance 2-7 on the handle 2 through the shell A2; the gear shaft C1-6 of the head is connected to the rotary motor 2-3 of the handle through the flexible drive shaft 3, and the input shaft A2-2 of the head is connected to the rotary motor 2-4 of the handle through the flexible drive shaft 4, so that the assembly shown in FIG. 3 is formed.

During work, a root canal file is fastened and mounted in the through hole B1-1 of the end gear shaft B1 in the head. When the rotary motor 2-3 inputs torque to the gear shaft C1-6 to drive the gear shaft C1-6 to rotate, the gear shaft C1-6 engaged with the T-shaped end gear shaft B1 will drive the T-shaped end gear shaft B1 and the root canal file mounted in the T-shaped end gear shaft B1 to rotate, and the I-shaped wheel B3 will not rotate synchronously. When the rotary motor 2-4 input torque to the shaft A2-2 to drive the shaft A2-2 to rotate, the wheel A2-3 will be driven to rotate to drive the eccentric shaft A2-4 to vibrate. Vibrations of the eccentric shaft A2-4 will be transmitted to the lever ring C1 through the connecting plate A2-5 and the vibration output shaft A2-6, so that the lever ring C1 is driven to vibrate. Due to the fact that the convex shaft C1-2 and the convex shaft C1-3 in the middle of the lever ring C1 are in clearance fit with the hole B3-1 and the hole B3-2 of the I-shaped wheel B3, the I-shaped wheel C3 will be driven to vibrate synchronously when the lever ring C1 vibrates. Due to the fact that the I-shaped wheel B3, the upper sleeve B2 and the lower sleeve B4 are locked on the T-shaped gear shaft B1 through the lock nut B5, the T-shaped gear shaft B1 and the root canal file mounted in the T-shaped end gear shaft B1 will be driven to vibrate synchronously when the I-shaped wheel B3 vibrates. When the rotary motor 2-3 and the rotary motor 2-4 work synchronously, the root canal file will be driven to mechanically vibrate and rotate.

After use, the head 1, the flexible drive shafts 3 and 4, and the handle 2 can be separated from each other, and the head 1 and the flexible drive shaft 3 and 4 can be sterilized at a high temperature and a high pressure.

When the root canal therapy device with a mechanical vibration mode and a rotation drive mode is used, the root canal file can rotate and vibrate synchronously during work; during root canal preparation, the root canal file can rotate to cut the wall of a root canal and maintain the original root canal axis, and the root canal file can also vibrate to drastically reduce cutting resistance and cutting temperature; and liquid in the root canal is stirred when the root canal file vibrates, so that the chip removal capacity of the root canal file is improved, a smear layer is effectively avoided, the quality of root canal preparation is remarkably improved, and the labor intensity of operators is relieved.

The above contents are used to further explain the invention in detail in conjunction with specific preferred implementations, but the specific implementations of the invention are not restricted to the above description. Those ordinarily skilled in the art can make several simple deductions or substitutions with departing from the concept of the invention, and all these deductions or substitutions should also fall within the protection scope of the invention.

What is claimed is:

1. A root canal therapy device with mechanical vibration mode and rotation drive mode, comprising a head, a handle, a first flexible drive shaft and a second flexible drive shaft,
    wherein the head comprises an outer main part, a mandrel part used for mounting a root canal file, a first drive input shaft part and a second drive input shaft part,
    the mandrel part is mounted in the outer main part,
    a first drive motor and a second drive motor are disposed on the handle,
    the first drive motor is connected to the first drive input shaft part through the first flexible drive shaft, and the first drive input shaft part is connected to the mandrel part and drives the mandrel part to rotate,
    the second drive motor is connected to the second drive input shaft part through the second flexible drive shaft, and the second drive input shaft part is connected to the mandrel part and drives the mandrel part to vibrate mechanically;
    wherein the second drive input shaft part comprises a vibration input shaft, a wheel, an eccentric shaft, a connecting plate and a vibration output shaft,
    the vibration input shaft has an end connected to the second flexible drive shaft and an end connected to the wheel,
    the eccentric shaft is mounted on the wheel, the connecting plate is mounted on the eccentric shaft, the vibration output shaft is mounted on the connecting plate, and the vibration output shaft is connected to the mandrel part and drives the mandrel part to vibrate mechanically.

2. The root canal therapy device with mechanical vibration mode and rotation drive mode according to claim 1, wherein the mandrel part comprises a T-shaped end gear shaft mounted in the outer main part, an upper sleeve, an I-shaped wheel and a lower sleeve,
    wherein the upper sleeve, the I-shaped wheel and the lower sleeve are disposed around the T-shaped end gear shaft from top to bottom,
    a lever ring is disposed around the I-shaped wheel and has an end rotatably connected to the outer main part and an end connected to the vibration output shaft,
    and the T-shaped end gear shaft is connected to the first drive input shaft part.

3. The root canal therapy device with mechanical vibration mode and rotation drive mode according to claim 2, wherein an upper ball groove is formed between an upper end of the I-shaped wheel and the upper sleeve,
    wherein a lower ball groove is formed between a lower end of the I-shaped wheel and the lower sleeve, balls are disposed in the upper ball groove and the lower ball groove, and the I-shaped wheel is in clearance fit with the T-shaped end gear shaft.

4. The root canal therapy device with mechanical vibration mode and rotation drive mode according to claim 2, wherein holes are formed in a waist of the I-shaped wheel in a radial direction, the lever ring is a circular ring and provided with a left lug and a right lug, and the lever ring is disposed around a middle of the I-shaped wheel, and convex shafts protruding inwards in the radial direction are disposed on the lever ring and are in clearance fit with the holes in the I-shaped wheel.

5. The root canal therapy device with mechanical vibration mode and rotation drive mode according to claim 4, wherein a left lug shaft hole is formed in the left lug of the lever ring, the left lug shaft is disposed on the outer main part, the left lug shaft hole is in clearance fit with the left lug shaft, a side plate is disposed on the right lug of the lever ring, and a right lug shaft hole is formed in a waist of the side plate and is in clearance fit with the vibration output shaft.

6. The root canal therapy device with mechanical vibration mode and rotation drive mode according to claim 5, wherein the first drive input shaft part comprises a gear shaft mounted at a top of the side plate, and the gear shaft is engaged and connected with the T-shaped end gear shaft through a gear.

7. The root canal therapy device with mechanical vibration mode and rotation drive mode according to claim 2, wherein the outer main part comprises a sleeve, wherein the T-shaped end gear shaft, the upper sleeve, the I-shaped wheel and the lower sleeve are all mounted in the sleeve, an upper circular gland is disposed at an upper end of the sleeve, a lower circular gland is disposed at a lower end of the sleeve, the I-shaped wheel is disposed between the upper circular gland and the lower circular gland, an upper elastic ring is disposed between the I-shaped wheel and the upper circular gland, and a lower elastic ring is disposed between the I-shaped wheel and the lower circular gland.

8. The root canal therapy device with mechanical vibration mode and rotation drive mode according to claim 7, wherein the upper elastic ring and the lower elastic ring are made of a high polymer material or a metal material, and the upper elastic ring and the lower elastic ring are in the shape of a ring, a spring or a membrane.

9. The root canal therapy device with mechanical vibration mode and rotation drive mode according to claim 2, wherein a lock nut is connected to a lower end of the T-shaped end gear shaft and is attached to a lower end of the lower sleeve, wherein the lock nut locks the upper sleeve, the I-shaped wheel and the lower sleeve on the T-shaped end gear shaft.

\* \* \* \* \*